United States Patent
Granlund et al.

(10) Patent No.: US 10,457,833 B2
(45) Date of Patent: Oct. 29, 2019

(54) MATERIALS CONTAINING FLUOROPOLYMERS FOR ADDITIVE MANUFACTURING APPLICATIONS

(71) Applicant: Stratasys, Inc., Eden Prairie, MN (US)

(72) Inventors: Neil R. Granlund, Columbia Heights, MN (US); Adam R. Pawloski, Lake Elmo, MN (US); Garrett S. Van Gorden, River Falls, WI (US); Luke M. B. Rodgers, Chaska, MN (US); Vittorio L. Jaker, New Brighton, MN (US)

(73) Assignee: STRATASYS, INC., Eden Prairie, MN (US)

( * ) Notice: Subject to any disclaimer, the term of this patent is extended or adjusted under 35 U.S.C. 154(b) by 331 days.

(21) Appl. No.: 15/385,345

(22) Filed: Dec. 20, 2016

(65) Prior Publication Data

US 2017/0174932 A1    Jun. 22, 2017

Related U.S. Application Data (60) Provisional application No. 62/270,922, filed on Dec. 22, 2015.

(51) Int. Cl.
| | | |
|---|---|---|
| *C09D 155/02* | (2006.01) | |
| *C09D 169/00* | (2006.01) | |
| *B33Y 70/00* | (2015.01) | |
| *B29C 67/00* | (2017.01) | |
| *B33Y 10/00* | (2015.01) | |
| *B29K 105/06* | (2006.01) | |
| *B29K 27/12* | (2006.01) | |
| *B29K 55/02* | (2006.01) | |

(52) U.S. Cl.
CPC ........ *C09D 169/00* (2013.01); *B29K 2027/12* (2013.01); *B29K 2055/02* (2013.01); *B29K 2105/06* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| | | |
|---|---|---|
| 4,863,538 A | 9/1989 | Deckard |
| 5,132,143 A | 7/1992 | Deckard |
| 5,204,055 A | 4/1993 | Sachs et al. |
| 5,503,785 A | 4/1996 | Crump et al. |
| 5,866,058 A | 2/1999 | Batchelder et al. |
| 6,004,124 A | 12/1999 | Swanson et al. |

(Continued)

FOREIGN PATENT DOCUMENTS

WO    WO-2015134316 A1 *  9/2015 ............. B33Y 10/00

*Primary Examiner* — Catherine S Branch
(74) *Attorney, Agent, or Firm* — Westman, Champlin & Koehler, P.A.

(57) ABSTRACT

Part materials for additive manufacturing applications include materials with a fluoropolymer processing aid (material-FP). These materials include one or more thermoplastic polymers and one or more fluoropolymers as a processing aid. The material-FP is used to build parts with additive manufacturing systems. Parts built using material-FP have improved physical properties including improved strength in the z-direction of the parts. Composite systems such as reinforced filaments with the material-FP also have a higher density.

14 Claims, 6 Drawing Sheets

(56) References Cited

U.S. PATENT DOCUMENTS

| | | |
|---|---|---|
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 8,153,182 B2 | 4/2012 | Comb et al. |
| 8,221,858 B2 | 7/2012 | Mannella et al. |
| 8,246,888 B2 | 8/2012 | Hopkins et al. |
| 8,459,280 B2 | 6/2013 | Swanson et al. |
| 2011/0186081 A1 | 8/2011 | Dunn et al. |
| 2012/0164256 A1 | 6/2012 | Swanson et al. |
| 2013/0077996 A1 | 3/2013 | Hanson et al. |
| 2013/0077997 A1 | 3/2013 | Hanson et al. |
| 2013/0186549 A1 | 7/2013 | Comb et al. |
| 2013/0186558 A1 | 7/2013 | Comb et al. |
| 2013/0333798 A1 | 12/2013 | Bosveld et al. |
| 2014/0141168 A1 | 5/2014 | Rodgers |
| 2018/0371249 A1* | 12/2018 | Bihari .................... C08L 83/10 |

* cited by examiner

PAEK – 25% Glass Fiber

FIG. 6

MATERIALS CONTAINING FLUOROPOLYMERS FOR ADDITIVE MANUFACTURING APPLICATIONS

CROSS REFERENCE TO RELATED APPLICATION(S)

The present application claims the benefit of U.S. Provisional Patent Application Ser. No. 62/270,922 entitled MATERIALS CONTAINING FLUOROPOLYMERS FOR ADDITIVE MANUFACTURING APPLICATIONS which was filed on Dec. 22, 2015, the contents of which are incorporated by reference in its entirety.

BACKGROUND

The present disclosure relates to additive manufacturing systems for printing three-dimensional (3D) parts and support structures. In particular, the present disclosure relates to materials for use in additive manufacturing systems, consumable assemblies retaining the materials, and methods of manufacturing and using the materials and assemblies in additive manufacturing systems to print 3D parts. All references disclosed herein are incorporated by reference.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques such as fused deposition modeling (FDM), electro-photography (EP), jetting, selective laser sintering (SLS), high speed sintering (HSS), powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure relates to a material for printing parts in an additive manufacturing system. The material includes a polymeric blend of a thermoplastic polymer(s) and one or more fluorinated polymer(s) as a processing aid, wherein the amount of fluorinated polymer in the material is at least about 0.01% by weight of the thermoplastic polymer. The material including the thermoplastic polymer(s) with a fluoropolymer processing aid, (material-FP) can be used for building parts in additive manufacturing systems. The fluorinated polymer (FP) may be selected from polyvinylidenedifluoride (PVDF), polyvinylidenedifluoride-co-hexafluoropropylene (PVDF-HFP), fluorinated ethylene-propylene (FEP), polytetrafluoroethylene (PTFE) or a combination thereof. The amount of the fluorinated polymer is at least about 0.01% by weight of the thermoplastic polymer(s). The amount of the fluorinated polymer may be less than about 5% by weight of the thermoplastic polymer(s), preferably less than about 1% by weight of the thermoplastic polymer(s). The fluorinated polymer may be partially or fully fluorinated. The thermoplastic polymer may be selected from one or more thermoplastic polymers that can be utilized in extrusion based additive manufacturing systems. A non-limiting list of materials includes ABS, polycarbonate (PC), polyetherimide (PEI) polyamides, polyesters, polyether ketones and the like. A fluoropolymer processing aid may also be included with other thermoplastic polymers and all are within the scope of this disclosure. The material-FP may further include one or more additives. The material-FP may be suitable for an extrusion-based additive manufacturing system and may be formed into a suitable media selected from filament, reinforced filaments, powders, micronized powders and other particulates. The reinforced filaments may include carbon and/or glass fibers.

In another aspect, the present disclosure relates to a method of making materials for printing a part. The method includes providing a polymeric blend comprising one or more thermoplastic polymers and a fluorinated polymer processing aid, processing the polymeric blend and the fluorinated polymer processing aid to form a material-FP and processing the material-FP into a consumable material for printing a part. The method may include utilizing a fluorinated polymer that may be selected from polyvinylidenedifluoride (PVDF), polyvinylidenedifluoride-co-hexafluoropropylene (PVDF-HFP), fluorinated ethylene-propylene (FEP), polytetrafluoroethylene (PTFE), perfluoroalkoxy polymer (PFA), ethylene-tretrafluoroethylene (ETFE), ethylene-chlorotrifluoroethylene copolymer (ECTFE), polychlorotrifluoroethylene (PCTFE), polyvinyl fluoride (PVF), amorphous fluoropolymers (AF), their copolymers, or a combination thereof. The amount of the fluorinated polymer is less than about 5% by weight of the thermoplastic polymer. The fluorinated polymer may be partially or fully fluorinated. The thermoplastic polymer may be selected from one or more thermoplastic polymers that can be utilized in extrusion based additive manufacturing systems. A non-limiting list of materials includes ABS, polycarbonate (PC), polyetherimide (PEI) polyamides, polyesters, polyether ketones and the like. The material-FP may further include one or more other additives. The material-FP may be suitable for an extrusion-based additive manufacturing system and may be formed into a suitable media selected from filament, reinforced filaments, powders, micronized powders and other particulates. The material-FP may also include fibers.

In a further aspect, the present disclosure relates to a method of printing a part. The method includes providing a consumable material comprising a thermoplastic polymer and a fluorinated polymer processing aid. The method also includes printing a part with the consumable material in a layer by layer manner wherein the strength in the z-direction of the part is higher than the strength in the z-direction of the printed part made from a thermoplastic polymer without the fluorinated polymer. The material includes a fluorinated polymer that may be selected from polyvinylidenedifluoride (PVDF), polyvinylidenedifluoride-co-Hexafluoropropylene (PVDF-HFP), fluorinated ethylene-propylene (FEP), polytetrafluoroethylene (PTFE), perfluoroalkoxy polymer (PFA), ethylene-tretrafluoroethylene (ETFE), ethylene-chlorotrifluoroethylene copolymer (ECTFE), polychlorotrifluoroethylene (PCTFE), polyvinyl fluoride (PVF), amorphous fluoropolymers (AF), their copolymers, or a combination thereof. The amount of the fluorinated polymer is less than about 5% by weight of the thermoplastic polymer and may be partially or fully fluorinated. The thermoplastic polymer may be selected from one or more thermoplastic polymers that can be utilized in extrusion based additive manufacturing systems. A non-limiting list of materials includes ABS, polycarbonate (PC), polyetherimide (PEI) polyamides, polyesters, polyether ketones and the like. The material may further include one or more other additives. The consumable materials may be in a suitable media selected from a filament, reinforced filaments, powders, micronized powders and other particulates. The consumable material may also include fibers such as carbon fibers, glass fibers and the like.

In yet a further aspect, the present disclosure relates to a consumable assembly for use in an additive manufacturing system. The consumable assembly includes a material-FP. Material-FP includes a thermoplastic polymer and a fluorinated polymer as a processing aid. The fluorinated polymer may be selected from polyvinylidenedifluoride (PVDF), polyvinylidenedifluoride-co-Hexafluoropropylene (PVDF-HFP), fluorinated ethylene-propylene (FEP), polytetrafluoroethylene (PTFE), perfluoroalkoxy polymer (PFA), ethylene-tretrafluoroethylene (ETFE), ethylene-chlorotrifluoroethylene copolymer (ECTFE), polychlorotrifluoroethylene (PCTFE), polyvinyl fluoride (PVF), amorphous fluoropolymers (AF), their copolymers, or a combination thereof. The amount of the fluorinated polymer may be less than about 5% by weight of the thermoplastic polymer. The thermoplastic polymer may be selected from one or more thermoplastic polymers that can be utilized in extrusion based additive manufacturing systems. A non-limiting list of materials includes ABS, polycarbonate (PC), polyetherimide (PEI) polyamides, polyesters, polyether ketones and the like. The material-FP may further include one or more other additives. The material-FP in the consumable assembly may be formed into a suitable media selected from filament, reinforced filaments, powders, micronized powders and other particulates.

DEFINITIONS

Unless otherwise specified, the following terms as used herein have the meanings provided below:

The term "polymer" refers to a polymeric material having one or more monomer species, including homopolymers, copolymers, terpolymers, and the like.

Reference to "a" chemical compound refers one or more molecules of the chemical compound, rather than being limited to a single molecule of the chemical compound. Furthermore, the one or more molecules may or may not be identical, so long as they fall under the category of the chemical compound. Thus, for example, "a" polyamide is interpreted to include one or more polymer molecules of the polyamide, where the polymer molecules may or may not be identical (e.g., different molecular weights and/or isomers).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

Unless otherwise specified, characteristics of a material or a 3D part printed from the material refer to the characteristics as measured parallel to the orientation of the 3D part layers and perpendicular to the layer-printing direction, and is referred to as an "xy-direction". Correspondingly, the term "z-direction", with reference to characteristics of a material or a 3D part printed from the material refer to the characteristics as measured perpendicular to the orientation of the 3D part layers and parallel to the layer-printing direction. Unless the measurement direction is specified as "in the z-direction", a measurement referred to herein is taken in the xy-direction. For example, a tensile strength of a 3D part of 10,000 psi refers to a tensile strength measured parallel to the layers of the 3D part. Alternatively, a tensile strength of a 3D part in the z-direction of 8,000 psi refers to a tensile strength measured perpendicular to the layers of the 3D part.

Unless otherwise specified, temperatures referred to herein are based on atmospheric pressure (i.e. one atmosphere).

The term "additive manufacturing system" refers to a system that prints, builds, or otherwise produces 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The term "providing", such as for "providing a consumable material", when recited in the claims, is not intended to require any particular delivery or receipt of the provided part. Rather, the term "providing" is merely used to recite parts that will be referred to in subsequent elements of the claim(s), for purposes of clarity and ease of readability.

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

"Fluorinated polymer" and "fluoropolymer" are equivalent and are used interchangeably herein.

The term "material(s)-FP" as referred to herein relates to material(s) that include a fluorinated polymer or fluoropolymer as a processing aid. The material(s)-FP can be used in an additive manufacturing system.

All patents, publications or other documents mentioned herein are incorporated by reference.

DETAILED DESCRIPTION

The present disclosure is directed to materials for printing 3D parts in a layer-by-layer manner in additive manufacturing. The materials compositionally include a polymeric matrix blend of one or more polymers. The polymeric materials further include fluoropolymer(s) as a processing aid. The materials with a fluoropolymer processing aid (material(s)-FP) can be the basis for a consumable material or feedstock to build a part through additive manufacturing in a layer by layer manner with improved physical characteristics. The inclusion of the fluoropolymer(s) in the polymeric matrix of the part material has been found to increase the z-strength of the printed part, can reduce the brittleness of the part material and increase the yielding strength of the part material. In other words, the fluoropolymer(s) additive can increase the strength and toughness in the z-direction of the printed parts. Furthermore, in filled systems, such as reinforced filaments, utilizing fluoropolymer(s) as a processing aid has been found to reduce void formation in the extrudate, resulting in a more desirable printed part due to the formation of a higher density printed part.

The disclosed consumable materials with a fluoropolymer processing aid (materials-FP) can be made by combining a fluoropolymer(s) with a number of commercially available thermoplastic polymer(s), and/or co-polymer(s). The thermoplastic polymers in the consumable materials include, but are not limited to, acrylonitrile-butadiene-styrene (ABS), polycarbonate (PC), and/or polyetherimide (PEI) resins, polyamides, polyesters, polyether ketones and the like. In some embodiments, the polymers may be amorphous polymers. However, the disclosed part materials are not limited to the inclusion of fluoropolymers with the above polymer(s) and/or co-polymer(s), but rather the fluoropolymer(s) as a processing aid can be included with any thermoplastic polymer(s), and/or co-polymer(s) having the capability of being utilized in part materials for an additive manufacturing device.

The materials-FP of the present disclosure are suitable for printing 3D parts having thermal properties compatible with a heated chamber of an additive manufacturing system (or at least a locally-heated deposition region) to partially relieve residual stresses as well as building parts with desirable mechanical properties (e.g., strength and ductility). During a printing operation, polymeric materials, e.g. materials-FP, can be melted and extruded as a series of roads in a single layer, which cool down to form layers of a 3D part. Due to the layer-by-layer nature of the printing, the cooling of each successive layer generates residual stresses in the 3D part, which are a function of the coefficient of thermal expansion, percent shrinkage, and tensile modulus of the material. If not relieved, the residual stresses may physically distort the 3D part, such as by causing the edges and corners of the 3D part to curl up, referred to as "curl" or "curling".

Without being bound by any theory, it is believed that fluoropolymers are incompatible with the thermoplastic polymers and that the fluoropolymers in the material tend to migrate to the surface of the formed layer. The migration of the fluoropolymers to the surface of the formed layer may lead to complex interfacial effects between an extruded layer and the successively formed layer. The interfacial effects are believed to beneficially lower the time and energy necessary to drive further polymer diffusion between layers. The material-FP may be substantially uniform compositionally during blending but some or all of the fluoropolymer may segregate to surfaces and interfaces during extrusion. Furthermore, it is also possible that the presence of fluoropolymers leads to smoother extrudate surfaces. Smoother extrudate surfaces tend to entrap less air and volatile substances, thus increasing the effective bead-to-bead contact area. It is also possible a combination of the smoother extrudate surfaces and the interfacial effects could be realized in a part that is stronger and tougher than a part with only polymeric materials (without a fluoropolymer processing aid).

Materials-FP can exhibit glass transition effects that can be controlled to partially relieve residual stresses. For example, as disclosed in Batchelder, U.S. Pat. No. 5,866,058, an amorphous polymeric material may be deposited into a heated chamber (or at least a locally-heat deposition region) maintained at a temperature that is between a solidification temperature and a glass transition temperature of the material. This anneals the successively-printed printed layers, allowing them to cool down and solidify slowly, which can partially relieve the residual stresses.

Additionally, the materials-FP are capable of forming strong interfacial bonds with support materials, allowing support structures to anchor and further relieve the residual stresses. These capabilities can contribute to a reduction in curl for resulting 3D parts. Once the 3D part has been printed, the support structure of the support material may be removed to reveal the completed 3D part, preferably without damaging any of the critical or delicate geometrical features of the 3D part. To accomplish this removal, the support material may be dissolved in aqueous solutions or dispersions, allowing the support structure to be at least partially, and typically completely dissolved away from the 3D part. The support structure may also be broken away from the 3D part, especially in embodiments where the 3D part is simple and does not have complicated and/or delicate structures.

The material-FP preferably has a physical geometry configured to be received by the additive manufacturing system for printing a 3D part in a layer-by-layer manner using an additive manufacturing technique. For example, the material-FP may have a geometry configured to be received by an extrusion-based additive manufacturing system (e.g., a filament geometry).

The material-FP of the present disclosure may be configured for use with several different additive manufacturing techniques, such as extrusion-based additive manufacturing systems, electrophotography-based additive manufacturing systems, and the like. Further, the use of the disclosed material is not limited to additive manufacturing.

Figure 1:
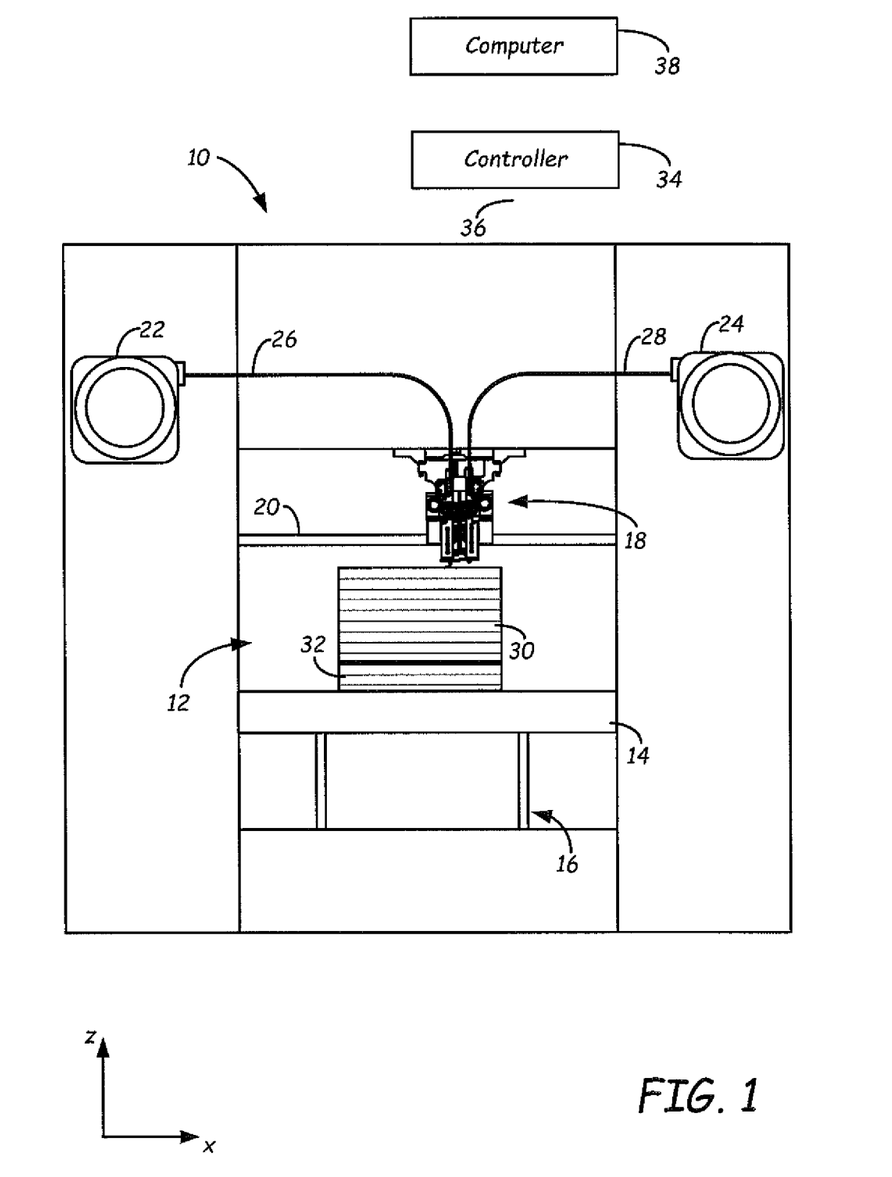
FIG. 1 is a front view of an extrusion-based additive manufacturing system configured to print 3D parts and support structures, where the support structures are printed from a support material of the present disclosure.

As shown in FIG. 1, system 10 is an example of an extrusion-based additive manufacturing system for printing or otherwise building 3D parts and support structures using a layer-based, additive manufacturing technique, where the parts may be printed from the materials-FP of the present disclosure. Suitable extrusion-based additive manufacturing systems for system 10 include fused deposition modeling systems developed by Stratasys, Inc., Eden Prairie, Minn. under the trademark "FDM".

In the shown embodiment, system 10 includes chamber 12, platen 14, platen gantry 16, print head 18, head gantry 20, and consumable assemblies 22 and 24. Chamber 12 is an enclosed environment that contains platen 14 for printing 3D parts and support structures. Chamber 12 may be heated (e.g., with circulating heated air) to reduce the rate at which the part and support materials solidify after being extruded and deposited. Alternatively, the heating may be localized rather than in an entire chamber 12. As discussed above, the heating anneals the printed layers of the 3D parts (and support structures) to partially relieve the residual stresses, thereby reducing curling of the 3D parts. In alternative embodiments, chamber 12 may be omitted and/or replaced with different types of build environments. For example, a 3D part and support structure may be printed in a build environment that is open to ambient conditions or may be enclosed with alternative structures (e.g., flexible curtains).

Platen 14 is a platform on which 3D parts and support structures are printed in a layer-by-layer manner. In the shown example, print head 18 is a dual-tip extrusion head configured to receive consumable filaments from consumable assemblies 22 and 24 (e.g., via guide tubes 26 and 28) for printing 3D part 30 and support structure 32 on platen 14. Consumable assembly 22 may contain a supply of the materials-FP for printing 3D part 30 from the materials-FP. Consumable assembly 24 may contain a supply of a support material for printing support structure 32 from the given support material. Platen 14 and print head 18 are moveable relative to each other.

System 10 also includes controller 34, which is one or more control circuits configured to monitor and operate the components of system 10. Controller 34 may communicate over communication line 36 with chamber 12 (e.g., with a heating unit for chamber 12), print head 18, platen 14, platen gantry 16, head gantry 20 and various sensors, calibration devices, display devices, and/or user input devices. System 10 and/or controller 34 may also communicate with computer 38, which is one or more computer-based systems that communicates with system 10 and/or controller 34.

Figure 2:
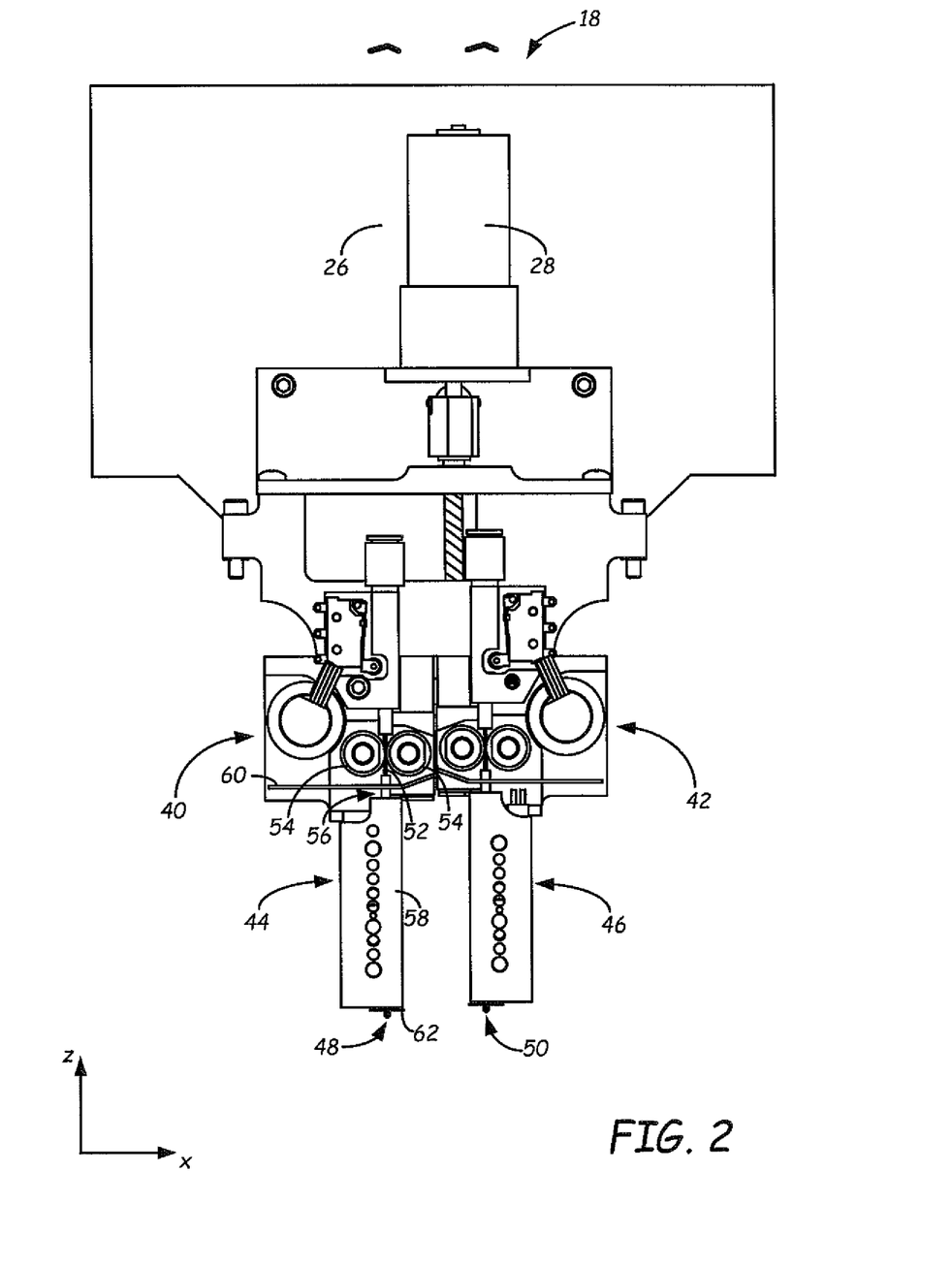
FIG. 2 is a front view of a print head of the extrusion-based additive manufacturing system.

FIG. 2 illustrates a suitable device for print head 18, as described in Leavitt, U.S. Pat. No. 7,625,200. Additional examples of suitable devices for print head 18, and the connections between print head 18 and head gantry 20 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182. In additional embodiments, in which print head 18 is an interchangeable, single-nozzle print head, examples of suitable devices for each print head 18, and the connections between print head 18 and head gantry 20 include those disclosed in Swanson et al., U.S. Patent Application Publication No. 2012/0164256.

Figure 3:
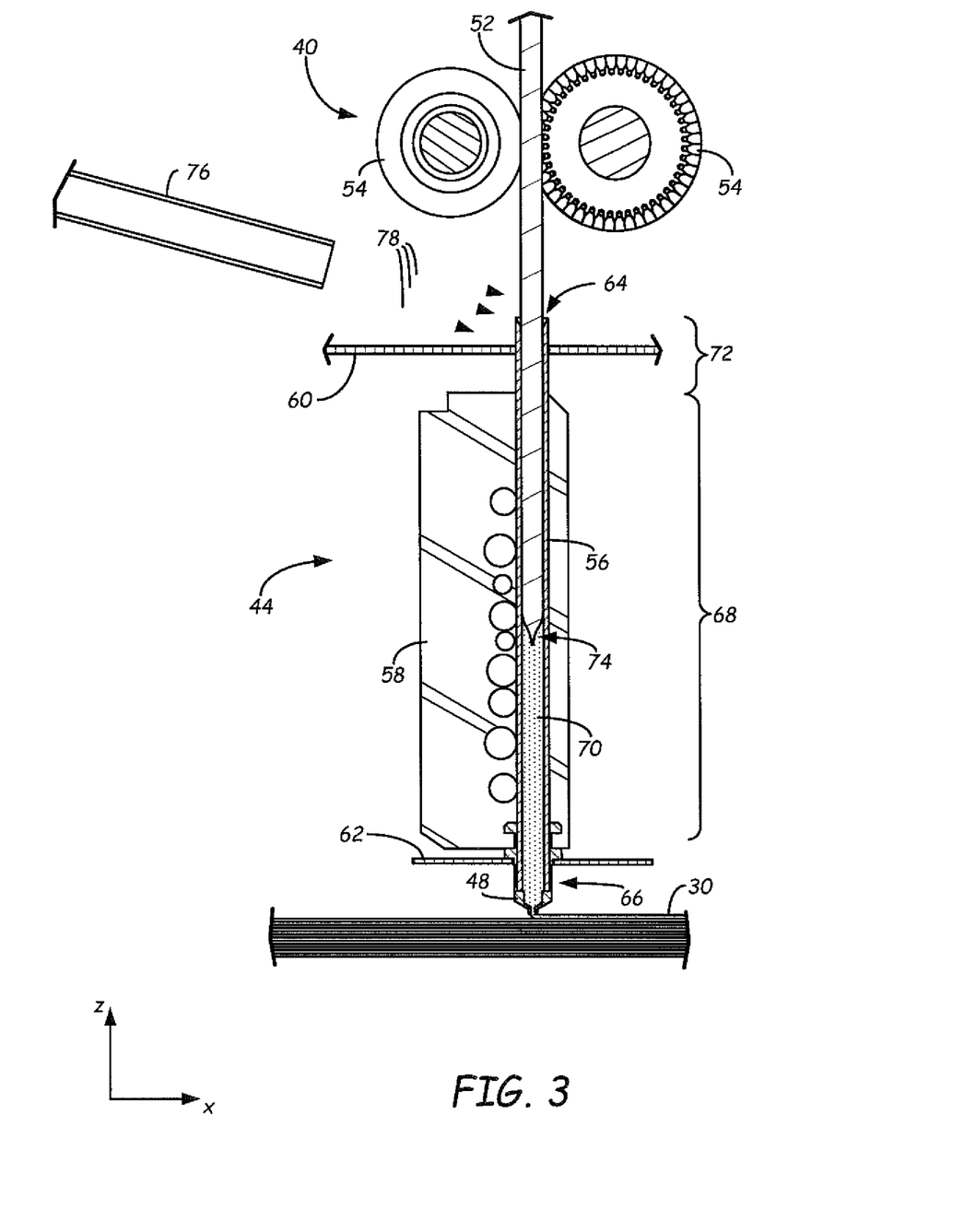
FIG. 3 is an expanded sectional view of a drive mechanism, a liquefier assembly, and a nozzle of the print head for use in the extrusion-based additive manufacturing system.

In the shown dual-tip embodiment, print head 18 includes two drive mechanism 40 and 42, two liquefier assemblies 44 and 46, and two nozzles 48 and 50. In this embodiment the materials-FP and the support material each preferably have a filament geometry for use with print head 18. For example, as best shown in FIG. 3, the materials-FP may be provided as filament 52.

During operation, controller 34 may direct wheels 54 of drive mechanism 40 to selectively draw successive segments filament 52 from consumable assembly 22 (via guide tube 26), and feed filament 52 to liquefier assembly 44. Liquefier assembly 44 may include liquefier tube 56, thermal block 58, heat shield 60, and tip shield 62, where liquefier tube 56 includes inlet end 64 for receiving the fed filament 52. Nozzle 48 and tip shield 62 are accordingly secured to outlet end 66 of liquefier tube 56, and liquefier tube 56 extends through thermal block 58 and heat shield 60. While liquefier assembly 44 is in its active state, thermal block 58 heats liquefier tube 56 to define heating zone 68. The heating of liquefier tube 56 at heating zone 68 melts the materials-FP of filament 52 in liquefier tube 56 to form melt 70.

The molten portion of the material-FP (i.e., melt 70) forms meniscus 74 around the unmelted portion of filament 52. During an extrusion of melt 70 through nozzle 48, the downward movement of filament 52 functions as a viscosity pump to extrude the materials-FP of melt 70 out of nozzle 48 as extruded roads to print 3D part 30 in a layer-by-layer manner. Cooling air may also be blown through a manifold 76 toward inlet end 64 of liquefier tube 56, as depicted by arrows 78. In some embodiments, controller 34 may servo or swap liquefier assemblies 44 and 46 between opposing active and stand-by states. This servo process may be repeated for each printed layer until 3D part 30 and support structure 32 are completed.

After the print operation is complete, the resulting 3D part 30 and support structure 32 may be removed from chamber 12, and support structure 32 may be removed from 3D part 30. The material-FP is capable of forming strong interfacial bonds with support materials, which may anchor and assist in relieving residual stresses in 3D part 30. However, the strong interfacial bond may also increase the difficulty in breaking support structure 32 apart from 3D part 30 without damaging 3D part 30. The support material is preferably a soluble support material, such as a water or alkaline solution-soluble support material. In these embodiments, support structure 32 may be removed from 3D part 30 by immersing the printed 3D part 30/support structure 32 in an aqueous solution or dispersion (e.g., an alkaline solution bath) to at least partially dissolve or disintegrate support structure 32.

In alternative embodiments, the materials-FP of the present disclosure may be provided in powder or pellet form for use in an auger-pump print head, such as disclosed in Bosveld et al., U.S. patent application Ser. No. 13/525,793. Moreover, the materials-FP may be provided in powder form for use in other powder-based additive manufacturing systems, such as selective laser sintering systems (e.g., systems disclosed in Deckard, U.S. Pat. Nos. 4,863,538 and 5,132, 143), powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the materials-FP are also preferably pelletized or otherwise micronized and/or classified to attain desired powder particle sizes for use in the particular system.

In further alternative embodiments, the materials-FP of the present disclosure may be provided in powder form for use in an electrophotography-based additive manufacturing system, such as those disclosed in Hanson et al., U.S. Publication Nos. 2013/0077996 and 2013/0077997, and Comb et al., U.S. Publication Nos. 2013/0186549 and 2013/0186558, the disclosures of which are incorporated by reference to the extent that they do not conflict with the present disclosure.

In embodiments wherein the materials-FP are provided as filaments, the filaments may be manufactured from a variety of materials-FP of the present disclosure. Types of filaments, formation of filaments into a desired media such as consumable assemblies containing the filaments for use with an additive manufacturing system are described, for example, in U.S. Patent Publication No. 2014/0141168 to Rodgers et al.

As described above, the part material of the present disclosure can include thermoplastic polymeric materials. The polymeric materials may have amorphous properties. The polymers can be homopolymers and/or copolymers derived from any number of monomers. In some embodiments, suitable part materials include polymer materials, such as thermoplastic materials, thermoset materials, amorphous metallic materials, and combinations thereof. Examples of suitable thermoplastic materials include acrylonitrile-butadiene-styrene (ABS) polymers or copolymers, polycarbonates (PC), polylactic acids (PLA), polysulfones, polyethersulfones, polyphenylsulfones, polyetherimides, amorphous polyamides, polyamides, polyesters, polyether ketones and modified variations thereof (e.g., ABS-M30 copolymers manufactured by Stratasys, Inc. located in Eden Prairie, Minn.), polystyrene, and blends thereof.

The polymeric materials of the present disclosure preferably include a fluoropolymer(s) component as a processing aid in the polymeric materials. The addition of a fluoropolymer as a processing aid to the polymeric matrix of the part material surprisingly results in the improvement of physical properties such as an increase in bonding between adjacent layers resulting in an increase in the z-strength of the printed parts. The addition of fluoropolymer(s) to the polymeric matrix can also reduce brittleness and improve the yielding characteristics. Moreover, the increase in the z-strength of the printed part can be observed by the inclusion of small amounts of the fluoropolymers.

Fluoropolymer(s) as used herein relates to fluorocarbon-based polymers with at least one, and typically multiple strong carbon-fluorine bonds. The fluoropolymer(s) may be partially fluorinated or alternatively, fully fluorinated. The fluoropolymers may contain as a minor component chlorinated monomers or monomers containing both chlorinated and fluorinated moieties. Suitable fluoropolymers include, without limitation, polyvinylidenedifluoride (PVDF), poly-vinylidenedifluoride-co-Hexafluoropropylene (PVDF-HFP), fluorinated ethylene-propylene (FEP), polytetrafluoroethylene (PTFE), perfluoroalkoxy polymer (PFA), ethylene-tretrafluoroethylene (ETFE), ethylene-chlorotrifluoroethylene copolymer (ECTFE), polychlorotrifluoroethylene (PCTFE), polyvinyl fluoride (PVF), amorphous fluoropolymers (AF), their copolymers, or a combination thereof. Other fluoropolymers may also be utilized and all are within the scope of this disclosure. In some embodiments, one fluoropolymer may be included in the part material. Alternatively, a combination of fluoropolymers may be included in the part material.

Fluoropolymers are generally formed by the polymerization of fluoroniated monomers. In one exemplary embodiment, vinylidene fluoride monomers are polymerized to form PVDF polymers having the following structural formula:

(Formula 1)

where n is the number of repeating vinylidene fluoride monomer units which may vary depending on the desired molecular weight of the PVDF.

In another exemplary embodiment, tetrafluoroethylene monomers are polymerized to form PTFE polymers having the following structural formula:

(Formula 2)

where n is the number of repeating tetrafluoroethylene monomer units which may vary depending on the desired molecular weight of the PTFE. These embodiments of fluoropolymers are exemplary and a number of other fluoropolymers may also be suitable and can be included in the part materials and all are within the scope of this disclosure.

Suitable amounts of fluoropolymer(s) included in the polymeric matrix can vary but are generally a small fraction of the polymeric matrix. The amount of fluoropolymer in the polymeric matrix is less than about 5% by weight of the thermoplastic polymers, preferably, less than about 1% by weight of the thermoplastic polymers and more preferably, less than about 0.5% by weight of the thermoplastic polymers and even more particularly less than about 0.25% by weight of the thermoplastic polymers. The amount of fluoropolymer to be included in the thermoplastic polymers as a processing aid is generally at least about 0.01% by weight of the thermoplastic polymers.

The composition of the materials-FP of the present disclosure may also include additional additives, such as impact modifiers, plasticizers, rheology modifiers, inert fillers, colorants, stabilizers, and combinations thereof. In embodiments that include colorants, preferred concentrations of the colorants in the materials-FP range from about 0.1% to about 5% by weight. Suitable colorants include titanium dioxide, barium sulfate, carbon black, and iron oxide, and may also include organic dyes and pigments.

In embodiments that include fillers, preferred concentrations of the fillers in the materials-FP range from about 1% to about 80% by weight. Suitable fillers include calcium carbonate, magnesium carbonate, glass spheres, graphite, carbon black, carbon fiber, glass fiber, talc, wollastonite, mica, alumina, silica, kaolin, silicon carbide, zirconium tungstate, soluble salts, and combinations thereof.

In embodiments that include plasticizers, preferred concentrations of the plasticizers in the materials-FP range from about 0.5% to about 20% by weight. Suitable additional plasticizers for use in the materials-FP include dialkyl phthalates, cycloalkyl phthalates, benzyl and aryl phthalates, alkoxy phthalates, alkyl/aryl phosphates, polyglycol esters, adipate esters, citrate esters, esters of glycerin, and combinations thereof.

In some embodiments, the fluoropolymer processing aid may act synergistically with other additives to reduce the formation of voids formed in fiber reinforced composites during thermoplastic extrusion. In one embodiment, the fluoropolymer processing aid can be combined with lubricious mineral materials, such as graphite, boron nitride, talc and combinations thereof. In another embodiment, the fluoropolymer processing aid can be combined with non-fluorinated lubricants, surfactants, and processing aids, for example, waxes, oils, ethoxylates, phosphates, silicones, polyesters, polyethers, polyols, polyglycols, and the like.

In embodiments with materials-FP and optionally, one or more of the above-discussed additional additives, the thermoplastic polymer and the fluoropolymer processing aid may constitute from about 55% to about 100% by weight of the material-FP, and more preferably from about 75% to about 100% by weight of the material-FP. In other embodiments, the thermoplastic polymer and the fluoropolymer processing aid may constitute from about 90% to about 100% by weight of the material-FP. In yet other embodiments, the thermoplastic polymer and the fluoropolymer processing aid may constitute from about 95% to about 100% by weight. In further embodiments, the material-FP consists essentially of the thermoplastic polymer and a fluoropolymer processing aid.

Examples of preferred compositions of the present disclosure include materials-FP with a blend of thermoplastic polymer and a fluoropolymer. Additional examples of preferred compositions for the material-FP of the present disclosure include ABS with varying quantities of fluoropolymers. Suitable fluoropolymers can include PVDF manufactured by Arkema, Inc. located in King of Prussia, Pa., under the Kynar® trade designation. Suitable fluoropolymers can also include Dynamar™ formulations manufactured by 3M Company located in St. Paul, Minn. In these embodiments, the fluoropolymer preferably constitutes from about 0.01% by weight to about 5% by weight of the thermoplastic material in the material-FP, more preferably from about 0.025% to about 1% by weight of the thermoplastic polymers where the ABS polymer or other thermoplastic polymers constitutes the remainder of the polymeric blend of the material-FP.

The materials-FP of the present disclosure advantageously have improved strength in the z-direction of a printed part. The strength in the z-direction of the printed part with the addition of a fluoropolymer processing aid can be increased by at least about 1 percent compared to the strength in the z-direction of the part printed by the same material without the inclusion of fluoropolymer. Preferably, the addition of a fluoropolymer can increase the strength in the z-direction by at least about 5 percent compared to the strength in the z-direction of the part materials without the inclusion of fluoropolymer. More preferably, the addition of a fluoropolymer can increase the strength in the z-direction by at least about 5 percent and preferably by at least about 10 percent compared to the strength in the z-direction of the part materials without the inclusion of fluoropolymer.

Figure 5:
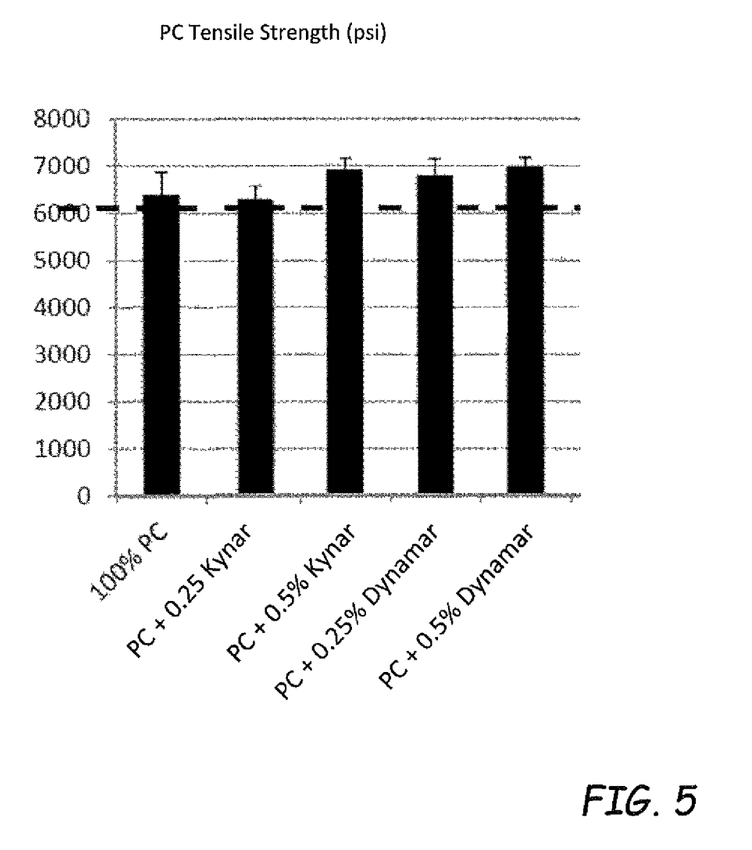
FIG. 5 is a graph of the effects of fluoropolymers in altering z-strength of a part printed with PC.
Figure 6:
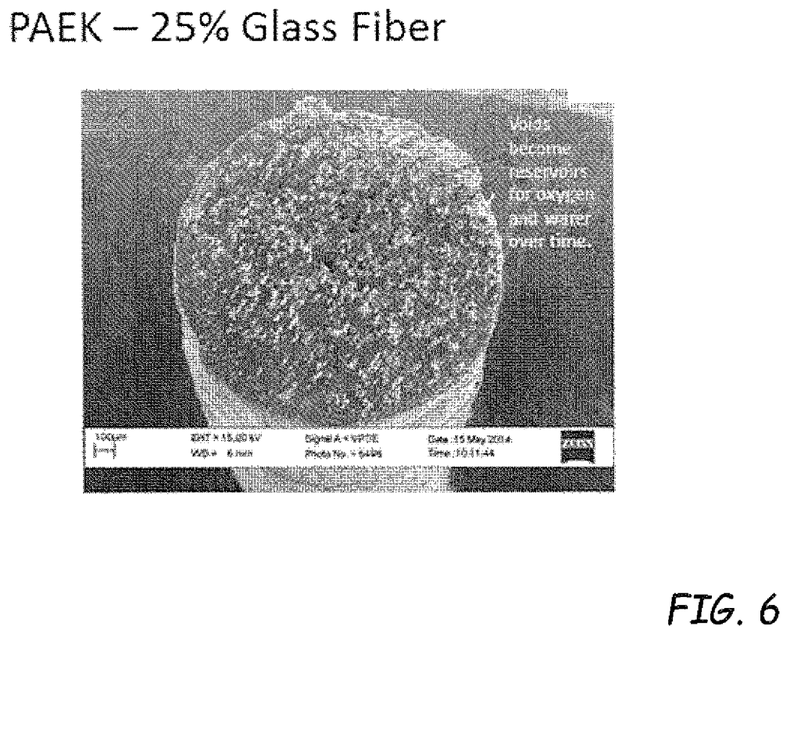
FIG. 6 is a photograph of microstructure of polyaryletherketone filled with glass fiber in an amount of 25 wt %.

As mentioned above, the thermoplastic polymers and the fluoropolymer(s) are preferably selected and blended at a ratio to produce 3D parts (e.g., 3D part 30) having good strength and ductility. For example, FIG. 5-6 illustrate plots of tensile strength of exemplary materials-FP of the present disclosure wherein improved part strength in the z-direction was found with fluoropolymer additives relative to a part built from the same part material without the fluoropolymer(s).

The material-FP may also be substantially homogenous, allowing each portion of the material-FP used in an additive manufacturing system to consistently exhibit the same thermal and physical properties. For example, with system 10 having print head 18, the flow rate of the molten material-FP (i.e., melt 70) from nozzle 48 is controlled by the rate at which filament 52 enters liquefier tube 56, and the melting rate of filament 52 within heating zone 68. System 10 may operate with preset instructions for extruding melt 70 at desired flow rates based on tool path geometries. These preset instructions are preferably based on the thermal properties of the material-FP, namely the melting rate and viscosity of the material-FP.

As such, if the material-FP was otherwise non-homogenous, the material-FP would not be uniform. This may cause successive segments of filament 52 to melt at different rates, affecting the height of meniscus 74. This accordingly can change the extrusion rate of melt 70 from the preset instructions, which can impair part quality in 3D part 30. Accordingly, filament 52 is preferably manufactured from a material-FP that is substantially homogenous. In embodiments that include one or more additives, the additive(s) are preferably dispersed in the material-FP blend in a substantially uniform manner.

The material-FP is preferably provided to an additive manufacturing system (e.g., system 10) in a "dry state", as opposed to a "conditioned state". For example, the filament for consumable assembly 22 may be dried prior to being fed to system 10. In some embodiments, the material-FP provided to system 10 (e.g., as filament in consumable assembly 22) preferably has a moisture concentration less than about 0.1% by weight, and more preferably less than about 0.08% by weight.

The present disclosure also includes composite systems that use thermoplastic composites as filament feedstocks to the FDM printer. Composite filaments can include, for example, fibers within the filament for reinforcement. These fibers can be of variable composition and can include, for example, carbon fibers or glass fibers. All of the fibers may be made from the same material or fibers made from differing materials may be included in the filaments.

Inclusion of fluoropolymer(s) in a composite filament beneficially increases the density of the composite filament. An increase in the density of a filament reduces the tendency of the filament to break and/or crack during winding, due to higher strength, and the dense filament is also less likely and less able to absorb atmospheric moisture resulting in higher quality printed parts.

For example, composite filaments containing carbon fiber reinforcement without the fluoropolymers can have low density, low strength and a tendency to rapidly absorb atmospheric moisture due to internal voids. The absorption of atmospheric moisture can lead to oozing and/or foaming of the extrudate during the additive manufacturing process when building a part using these filaments, resulting in a lower quality part or a part failure.

In one embodiment, the present disclosure includes reinforced composite filaments that include fibers and one or more fluoropolymers as a processing aid. As described above, the fluoropolymer(s) can be included with the desired polymeric materials such as ABS, PC, PLA, PEI and the like. In other words, the reinforced composite filaments can include materials-FP and fibers. The materials-FP can be used in a variety of methods that are suitable for making composite filaments.

The increase in the density of a composite filament by the inclusion of a fluoropolymer processing aid can vary dependent on the amount of fluoropolymer processing aid, the type of fluoropolymer processing aid and the like. The density of a composite filament with a fluoropolymer processing aid can be increased by at least about 5%, preferably at least about 10%, relative to a composite filament without the fluoropolymer processing aid The present disclosure includes consumable assemblies that can be used in additive manufacturing systems. The consumable assemblies can include materials-FP as disclosed herein as the consumable materials. The materials-FP can be configured to a desired suitable form for inclusion in the consumable assemblies. In some embodiments, the consumable assemblies include materials-FP as filaments. The structure of the filaments can vary and include structures that are, for example, cylindrical or substantially cylindrical geometry. The structure of the filaments may also have a non-cylindrical geometry such as a ribbon filament. The filaments may be hollow, solid or have a core-shell geometry. The filaments in the consumable assemblies may be of variable length and width or diameter. The consumable assemblies may also include powders, micronized particles, or other particulates of a variety of sizes and shapes. The shapes of the powders and/or micronized particles may by regular such as spheres or irregular. Consumable assemblies having materials-FP in other sizes and shapes can also be suitable in additive manufacturing systems and all are within the scope of this disclosure.

The present disclosure also includes a method of making materials for printing parts. The methods can include making part materials for additive manufacturing systems that include fluoropolymers as a processing aid. The part materials, e.g. material-FP, can then be configured into a desired form of consumable materials, e.g. a filament, powder, for the additive manufacturing systems.

The method can include combining components to form the material-FP. The components of the material-FP can include, for example, one or more thermoplastic polymers, a fluoropolymer and optionally, any one or more other additives as disclosed herein. The components of the material-FP can be formulated for example, by melt processing to form the material-FP. All of the components desired in the material-FP can be processed by melt processing such as by twin screw extrusion to form an extrudate. The extrudate can be directly made into filament feedstock for FDM, or granulated into pellets or micropellets to be used in subsequent processes. Granulates can be further processed into powders and particulates by methods such as grinding and milling, or optionally dissolved into solutions or gels using solvents. The filament may then be incorporated into a consumable assembly. The extrudate may optionally, be dried prior to incorporation into a consumable assembly.

In some embodiments, the fluoropolymer and the other thermoplastic polymers may be combined first prior to melt processing Alternatively, the other polymers, e.g. the non-fluoropolymers, may be melt processed first and then the fluoropolymer may be added and subsequently melt processed again. Melt processing of the polymers and the fluoropolymers is one exemplary method and other suitable methods may also be used to form the part materials and/or the consumable materials.

The method can include formation of the part material into any number of different forms of consumable materials. The specific form of the consumable material can be dependent on the end use of the part material and the specific method of additive manufacturing. In addition to filaments, the consumable materials may be formed into particles and/or powders of varying sizes that are compatible with the different additive manufacturing methods as described herein.

In some embodiments, the method may also include the incorporation of one or more additives described above. The specific types and amounts of additives can be dependent on the end use and the desired properties of the material-FP or consumable material. The thermoplastic polymer, fluoropolymer and the additives may be combined in any order and processed using a variety of suitable methods. The additives may be added to the thermoplastic polymers, and the fluoropolymer(s) and processed, i.e. all the components are added and melt processed in one step.

Alternatively, the thermoplastic polymer and the fluoropolymers may first be combined, e.g. by melt processing. The other additives can be included after melt processing the thermoplastic polymer and the fluoropolymer. The thermoplastic polymer, fluoropolymer and all of the desired additives can be further processed such as by another cycle of melt processing to form the material-FP. Melt processing is used as an exemplary method for processing the components of the material-FP. Formation of extrudates or consumable materials by other suitable methods of processing may also be used and are within the scope of this disclosure.

The present disclosure also includes a method of printing 3D parts using the consumable materials with the materials-FP described herein. The consumable materials preferably can include a thermoplastic polymer and a fluoropolymer(s) as described herein. The consumable material can be provided, for example, in consumable assemblies in a variety of forms, e.g. filaments, particles etc., to an additive manufacturing system. In embodiments with the consumable materials in filament form, the filament can be provided, for example, to system 10 having print head 18 within consumable assembly 22. System 10 may operate with preset instructions for extruding melt 70 at desired flow rates based on tool path geometries. These preset instructions are preferably based on the thermal properties of the consumable material, namely the melting rate and viscosity of the materials-FP.

The method includes printing the part in a layer by layer manner utilizing an additive manufacturing system. The strength in the z-direction of a printed part manufactured utilizing a consumable assembly with a material-FP can be higher than the strength in the z-direction of the part made from a consumable assembly with material without a fluoropolymer processing aid.

If the printed parts require support structures, any suitable support materials may be used in conjunction with the consumable materials described herein. The support materials selected can be dependent on the properties of the materials-FP and are generally compatible with the thermal properties of the materials-FP.

Powder-Based Additive Manufacturing

In addition to the extrusion-based additive manufacturing system, which preferably provides the material-FP in filament form, the material-FP may alternatively be provided to an extrusion-based additive manufacturing system in powder form for use in an auger-pump print head, such as disclosed in Bosveld et al., U.S. Publication No. 2013/0333798.

In this embodiment, the part material, for example, material-FP is formed first and then preferably pelletized or otherwise micronized and/or classified to attain desired powder particle sizes for use in the auger-pump print head. Examples of suitable average particles sizes for the support material powder range from about 15 micrometers to about 125 micrometers, and in some embodiments from about 20 micrometers to about 50 micrometers.

Moreover, the material-FP may be provided in powder form for use in other powder-powder-based additive manufacturing systems, such as selective laser sintering systems (e.g., systems disclosed in Deckard, U.S. Pat. Nos. 4,863,538 and 5,132,143), high speed sintering systems, powder/binder systems (e.g., systems disclosed in Sachs et al., U.S. Pat. No. 5,204,055), sand casting systems, electron-beam systems, and the like. Additional systems for the embodiment include those disclosed in Mannella et al., U.S. Pat. No. 8,221,858. In these embodiments, the material-FP is also preferably pelletized or otherwise micronized and/or classified to attain desired powder particle sizes for use in the particular system.

In alternative embodiments, the part material (without the fluoropolymer) is pelletized or otherwise micronized and/or classified to attain desired powder particle sizes. The fluoropolymer can also be pelletized or otherwise micronized and/or classified to attain desired powder particle sizes. The powdered part material and the powdered fluoropolymer are then combined to form the powdered material-FP for use in the powder-based additive manufacturing systems.

Electrophotography-Based Additive Manufacturing

In another embodiment, the material-FP is configured for use in an electrophotography-based additive manufacturing system to print 3D parts, in association with a support material used to print 3D parts, with high resolutions and fast printing rates. Examples of suitable electrophotography-based additive manufacturing systems for this embodiment include those disclosed in Hanson et al., U.S. Publication Nos. 2013/0077996 and 2013/0077997, and Comb et al., U.S. Publication Nos. 2013/0186549 and 2013/0186558.

In electrophotography-based methods, during a printing operation, EP engines may develop or otherwise image each layer of the part and support materials using the electrophotographic process. The developed layers are then transferred via a transfer assembly to a layer transfusion assembly where they are transfused (e.g., using heat and/or pressure) to print one or more 3D parts and support structures in a layer-by-layer manner. Accordingly, the part material of the present disclosure is preferably thermally stable while being transfused at a layer transfusion assembly.

As mentioned above, the part material is engineered for use in an electrophotography-based additive manufacturing system to print 3D parts. As such, the part material may also include one or more materials, e.g. charge control agents and/or heat absorbers, to assist in developing layers with EP engine, to assist in transferring the developed layers from EP engine to layer transfusion assembly, and to assist in transfusing the developed layers with a layer transfusion assembly.

Support Structure Removal

After the printing operation is completed with any of the above-discussed additive manufacturing systems, the resulting 3D part and support structure may be removed from the system and undergo one or more post-printing operations. For example, the support structure derived from the support material of the present disclosure may be sacrificially removed from the 3D part, such as by using an aqueous solution or dispersion.

In comparison, the part material is typically chemically resistant to aqueous solutions. This allows the use of an aqueous solution or dispersion to be employed for removing the sacrificial support structure without degrading the shape or quality of the 3D part. Examples of suitable systems and techniques for removing support structure in this manner include those disclosed in Swanson et al., U.S. Pat. No. 8,459,280; Hopkins et al., U.S. Pat. No. 8,246,888; and Dunn et al., U.S. Publication No. 2011/0186081.

Property Analysis and Characterization Procedures

Various properties and characteristics of the part and support materials described herein may be evaluated by various testing procedures as described below:
1. Glass Transition Temperature and Melt Processing Temperature The glass transition temperature is determined using the classical ASTM method employing Differential Scanning Calorimetry (DSC) ASTM D3418-12e1 and is reported in degrees Celsius. The test is performed with a DSC analyzer commercially available under the tradename "DSC 6000" from PerkinElmer, Waltham, Mass. under nitrogen at a heating rate of 10° C./min.
2. Mechanical Analysis A. Tensile strength and elongation measurements along the z-axis were performed using an MST Criterion Model 43 load frame commercially available from MTS Systems Corporation Eden Prairie, Minn. Type IV dog-bones were tested using methods outlined in ASTM D638 at a pull rate of 0.2 in/min. Tensile modulus and strength are reported as psi. Elongation reported as a percent.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Example 1

The formulations referenced in Table 1 were prepared by the following protocol. ABS-M30 (commercially available from Stratasys, Inc., Eden Prairie, Minn.) and Dynamar 5920A fluoropolymer (commercially available from 3M Company, St. Paul, Minn.) were dry blended then gravity fed into a 27 mm co-rotating 32:1 L/D extruder equipped with a 3 strand die. (commercially available from American Leistritz Extruder Corporation, Sommerville, N.J.). All formulations were compounded at 250 rpms using the following temperature profile: Zone 1-2=210° C., Zone 3-4=230° C., Zone 5-8=230° C., die=230° C. The resulting strands were allowed to cool in the air, then cut in to pellets approximately $\frac{1}{4}^{th}$ inch in length.

Filament was created by placing the ABS/fluoropolymer compounds into a 1.25" single screw 2.5:1 L/d extruder (PFEX, Genca Engineering Inc.) operating at 20 rpm. The temperature profile during extrusion was as follows: zone 1-3: 210° C. 220° C., 220° C., zone 4: 230° C., Die: 240° C. The composition was then extruded through a monofilament die, pulled through an air ring, then around an airframe to cool. The resulting filament was fed through a laser micrometer linked to a pulling system used to size the filament to a specific diameter. This filament was then wound onto a spool for use in various FDM systems.

The formulations referenced in Table 2 were prepared by the following protocol. PC (commercially available from Stratasys, Inc, Eden Prairie, Minn.) and Dynamar 5920A fluoropolymer (commercially available from 3M Company, St. Paul, Minn.) were dry blended then gravity fed into a 27 mm co-rotating 32:1 L/D extruder equipped with a 3 strand die. (commercially available from American Leistritz Extruder Corporation, Sommerville, N.J.). All formulations were compounded at 250 rpms using the following temperature profile: Zone 1-2=260° C., Zone 3-4=270° C., Zone 5-8=280° C., die=260° C. The resulting strands were allowed to cool in the air, then cut into pellets approximately ¼$^{th}$ inch in length.

Filament was created by placing the PC/fluoropolymer compounds into a 1.25" single screw 2.5:1 L/D extruder (PFEX, Genca Engineering Inc.) operating at 20 rpm. The temperature profile during extrusion was as follows: 1-3: 270° C., 275° C., 275° C., zone 4: 275° C., Die: 275° C. The composition was then extruded through a monofilament die, pulled through an air ring, then around an airframe to cool. The resulting filament was fed through a laser micrometer linked to a pulling system used to size the filament to a specific diameter. This filament was then wound onto a spool for use in various FDM systems.

Parts were printed utilizing a Fortus 400mc system manufactured by Stratasys, Inc. located in Eden Prairie, Minn. Filaments consisting of the formulations listed in table 1 were melted in an extrusion head liquefier of the Fortus system at a set temperature range of 275° C. to 350° C. The resulting molten material was then deposited in a heated build envelope maintained at a temperature of 85-100° C. ASTM D638 type IV test specimens were formed from a single layer sheet built up in the z-direction.

Figure 4:
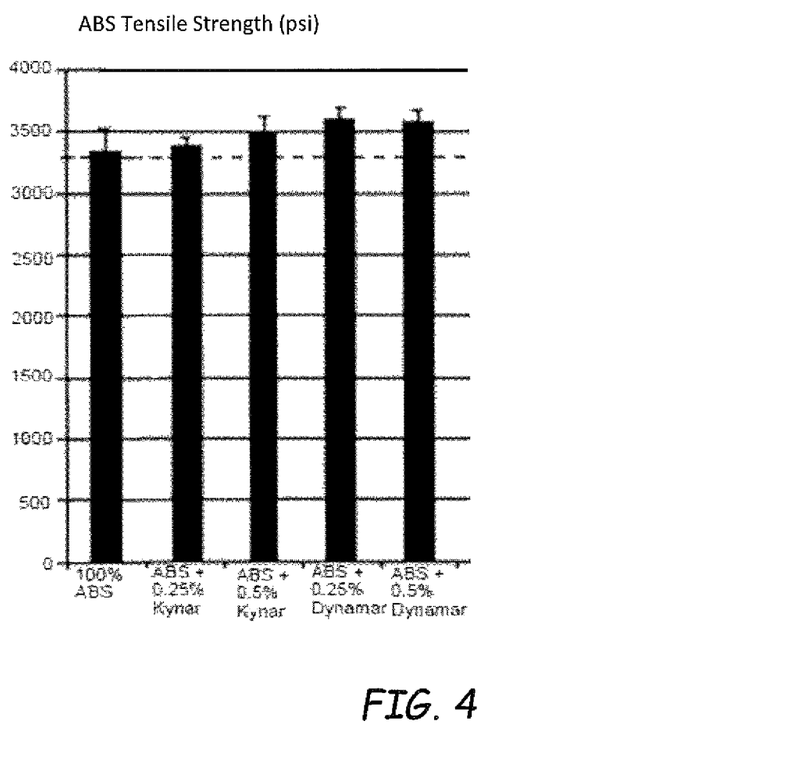
FIG. 4 is a graph of the effects of fluoropolymer additives in altering the z-strength of a part printed with ABS.

FIG. 4 and Table 1 below show the positive effects of polymer processing aids, including PVDF formulations sold under the Kynar® trade designation by Arkema, Dynamar™ formulations manufactured by 3M Company located in St. Paul, Minn. These additives did not adversely affect the physical properties of ABS and resulted in increases up to 10% in z-directions strength at loading levels equal to or less than 0.5%.

TABLE 1

| Sample description | Tensile Strength (psi) | | Tensile Modulus (psi) | | Elongation @ break (%) | |
|---|---|---|---|---|---|---|
| | Ave. | SD | Ave. | SD | Ave. | SD |
| 100% ABS | 3340 | 183 | 254000 | 9830 | 1.78 | 0.12 |
| ABS + 0.25% Kynar | 3400 | 51 | 251000 | 2210 | 0.9 | 0.04 |
| ABS + 0.5% Kynar | 3490 | 127 | 261000 | 6760 | 0.9 | 0.05 |
| ABS + 0.25% Dynamar | 3620 | 67 | 263000 | 7890 | 0.93 | 0.03 |
| ABS + 0.5% Dynamar | 3600 | 81 | 266000 | 6400 | 0.9 | 0 |

The addition of Kynar®, and Dynamar® increased tensile strength of a part in the z-direction relative to a part printed with 100% by weight ABS.

FIG. 5 and Table 2 show similar benefits of fluoropolymer processing aids in increasing the z-strength of polycarbonate (PC) built with a Fortus 400mc system manufactured by Stratasys, Inc. located in Eden Prairie, Minn. Filaments consisting of the formulations listed in Table 2 were melted in an extrusion head liquefier of the Fortus system at a set temperature range of 345° C. to 365° C. The resulting molten material was then deposited in a heated build envelope maintained at a temperature of 135-145° C. ASTM D638 type IV test specimens were formed from a single layer sheet built up in the z-direction.

TABLE 2

| Sample description | Tensile Strength (psi) | | Tensile Modulus (psi) | | Elongation @ break (%) | |
|---|---|---|---|---|---|---|
| | Ave. | SD | Ave. | SD | Ave. | SD |
| 100% PC | 6380 | 484 | 262000 | 10100 | 3.36 | 0.37 |
| PC + 0.25% Kynar | 6310 | 268 | 245000 | 2900 | 1.7 | 0.11 |
| PC + 0.5% Kynar | 6930 | 241 | 253000 | 11200 | 1.98 | 0.04 |
| PC + 0.25% Dynamar | 6810 | 357 | 261000 | 5960 | 1.88 | 0.13 |
| PC + 0.5% Dynamar | 6980 | 199 | 264000 | 6850 | 1.88 | 0.08 |

The inclusion of Kynar® and Dynamar® in weight percent less than 1% by weight in PC increases the strength of the part with the z-direction compared to a part printed with 100% by weight PC.

In composite materials, the fluoropolymers' action of reducing head pressures and shear stresses in extruders may be beneficial in reducing the stress applied to a relatively weak polymer/fiber interface. This, combined with higher base polymer mobility may lead to less tendency for de-wetting and void formation after rapidly cooling from a high-shear, high stress state.

FIG. 6 is a photograph showing a typical voided microstructure observed in a filled high-temperature polymer extrudate. The voided microstructure decreases the density of the consumable material which in turn decreases the density of the printed part and allows for moisture penetration which may result in foaming.

Table 3 (below) shows that a processing aid is more effective than a low viscosity base resin at increasing extruded filament density. Using higher levels of processing aid obtains higher densities at higher speeds (higher shear stresses) and at higher temperatures. Lower temperatures may afford more favorable conditions for slip in the die, but they can also lead to less uniform feeding and melting.

TABLE 3

| Material | Formulation | Die | Rate | Melt Temp | Density | Comments |
|---|---|---|---|---|---|---|
| 1040 CF30 | Low viscosity PEI | Torpedo v2 | 8 RPM | 580 | 1.07 | |
| 1040 CF30 | Low viscosity PEI | Torpedo v2 | 7 RPM | 610 | 0.90 | |
| 1040 CF30 | Low viscosity PEI | Torpedo v2 | 8 RPM | 580 | 1.07 | |
| XP1251 | Medium viscosity 0.25% PA | Torpedo v2 | 25 RPM | 637 | 1.09 | |
| XP1251 | Medium viscosity 0.25% PA | Torpedo v2 | 5 RPM | 670 | 1.07 | |

TABLE 3-continued

| Material | Formulation | Die | Rate | Melt Temp | Density | Comments |
|---|---|---|---|---|---|---|
| XP1251 | Medium viscosity 0.25% PA | Torpedo v2 | 5 RPM | 560 | 1.20 | |
| XP1251 | Medium viscosity 0.25% PA | 0.074" STD | 5 RPM | 626 | 1.10 | End spool |
| XP1251 | Medium viscosity 0.25% PA | 0.074" STD | 8 RPM | 570 | 1.27 | Spooling, 6000 psi |
| XP1288 | Medium viscosity 0.75% PA | 0.078" STD | 14 RPM | 590 | 1.22 | Spooling, 3000 psi |

Although the present disclosure has been described with reference to preferred embodiments, workers skilled in the art will recognize that changes may be made in form and detail without departing from the spirit and scope of the disclosure.

The invention claimed is:

1. A feedstock for making a three dimensional part using an additive manufacturing technique, the feedstock comprising one or more thermoplastic polymer selected from the group consisting of ABS, polyetherimide (PEI), polyamides, polyesters, polyether ketones, and combinations thereof and a processing aid comprising at least one fluorinated polymer selected from the group consisting of polyvinylidenedifluoride (PVDF), polyvinylidenedifluoride-co-Hexafluoropropylene (PVDF-HFP), fluorinated ethylene-propylene (FEP), perfluoroalkoxy polymer (PFA), ethylene-tretrafluoroethylene (ETFE), ethylene-chlorotrifluoroethylene copolymer (ECTFE), polychlorotrifluoroethylene (PCTFE), polyvinyl fluoride (PVF), amorphous fluoropolymers (AF), their copolymers, or a combination thereof, wherein the amount of the fluorinated polymer in the material is between at least about 0.01% by weight of the thermoplastic polymer and about 1% by weight of the thermoplastic polymer, wherein the feedstock that has a density that is higher than a same thermoplastic polymer without the fluorinated polymer, wherein the feedstock is configured to be loaded into an additive manufacturing system and formed into the part in a layer-wise manner wherein the fluorinated polymer increases a z-strength of the part in a z direction relative to the part printed without the fluorinated polymer.

2. The feedstock of claim 1 wherein the amount of the fluorinated polymer is between about 0.025% by weight and about 1% by weight of the thermoplastic polymer.

3. The feedstock of claim 1 wherein the amount of the fluorinated polymer is between about 0.1% by weight and about 0.5% by weight of the thermoplastic polymer.

4. The feedstock of claim 1 wherein the material further comprises one or more additives.

5. The feedstock of claim 1 wherein the thermoplastic polymer and the processing aid is formed into a suitable media selected from the group consisting of filament, reinforced filaments, powders, micronized powders and other particulates.

6. The feedstock of claim 1 wherein the thermoplastic polymer and the processing aid is formed into a filament and further comprises fibers.

7. A method of printing a part comprising:
providing a consumable feedstock to an additive manufacturing system comprising a thermoplastic polymer selected from the group consisting of ABS, polyetherimide (PEI), polyamides, polyesters, polyether ketones, and combinations thereof and a fluorinated polymer selected from the group consisting of polyvinylidenedifluoride (PVDF), polyvinylidenedifluoride-co-Hexafluoropropylene (PVDF-HFP), fluorinated ethylene-propylene (FEP), perfluoroalkoxy polymer (PFA), ethylene-tretrafluoroethylene (ETFE), ethylene-chlorotrifluoroethylene copolymer (ECTFE), polychlorotrifluoroethylene (PCTFE), polyvinyl fluoride (PVF), amorphous fluoropolymers (AF), their copolymers, or a combination thereof, wherein the amount of the fluorinated polymer in the feedstock is between at least about 0.01% by weight of the thermoplastic polymer and about 1% by weight of the thermoplastic polymer, wherein the feedstock has a density that is higher than a same thermoplastic polymer without the fluorinated polymer; and
printing the part with the consumable feedstock in a layer-wise manner wherein the fluorinated polymer increases a strength of the part in a z direction relative to the part printed without the fluorinated polymer.

8. The method of claim 7 wherein the z-strength of the part printed with the consumable feedstock is at least about 5% more than the z-strength of the part printed with the thermoplastic material without the fluorinated polymer.

9. The method of claim 7 wherein the consumable feedstock is in a suitable media selected from the group consisting of a filament, a reinforced filament, powders, particulates and combinations thereof.

10. The method of claim 9 wherein the reinforced filament further comprises fibers.

11. A consumable assembly for use in an additive manufacturing system, the assembly comprising material-FP, wherein the material-FP comprises a thermoplastic polymer selected from the group consisting of ABS, polyetherimide (PEI), polyamides, polyesters, polyether ketones, and combinations thereof and a fluoropolymerselected from the group consisting of polyvinylidenedifluoride (PVDF), polyvinylidenedifluoride-co-Hexafluoropropylene (PVDF-HFP), fluorinated ethylene-propylene (FEP), perfluoroalkoxy polymer (PFA), ethylene-tretrafluoroethylene (ETFE), ethylene-chlorotrifluoroethylene copolymer (ECTFE), polychlorotrifluoroethylene (PCTFE), polyvinyl fluoride (PVF), amorphous fluoropolymers (AF), their copolymers, or a combination thereof, wherein the amount of the fluorinated polymer in the material is between at least about 0.01% by weight of the thermoplastic polymer and about 1% by weight of the thermoplastic polymer, wherein the feedstock that has a density that is higher than a same thermoplastic polymer without the fluorinated polymer.

12. The assembly of claim 11 wherein the material-FP further comprises one or more additives.

13. The assembly of claim 11 wherein the material-FP is formed into a suitable media selected from the group consisting of filament, reinforced filaments, powders, micronized powders and other particulates.

14. The assembly of claim 13 wherein the reinforced filaments comprise carbon fibers, glass fibers or combinations thereof.

* * * * *